Oct. 11, 1966　　C. C. QUARLES　　3,278,265

PROCESS FOR THE MANUFACTURE OF HYDROGEN FLUORIDE

Filed Jan. 19, 1965

INVENTOR
CHARLES C. QUARLES

BY *Norbert F. Reinert*

ATTORNEY

United States Patent Office 3,278,265
Patented Oct. 11, 1966

3,278,265
PROCESS FOR THE MANUFACTURE OF
HYDROGEN FLUORIDE
Charles C. Quarles, Baytown, Tex., assignor to E. I. du Pont de Nemours and Company, Wilmington, Del., a corporation of Delaware
Filed Jan. 19, 1965, Ser. No. 426,601
1 Claim. (Cl. 23—153)

This invention relates to the production of hydrogen fluoride in which a metal fluoride is reacted with a gaseous mixture containing sulfuric acid vapor, sulfur trioxide vapor, and steam.

More particularly, the present invention is directed to an improvement in the process for producing hydrogen fluoride disclosed in U.S. Patent 3,102,787, issued to D. McMillan et al. on September 3, 1963, assigned to my assignee, in which liquid sulfuric acid condenses onto a metal fluoride from a gas stream containing sulfuric acid vapor, sulfur trioxide vapor, and water vapor and in which process the heat liberated during said condensation supplies the endothermic heat required to react the condensed sulfuric acid with the metal fluoride onto which it condensed.

In conducting this process in a continuous counter-current gas to solid contacting scheme, such as in a rotating kiln reactor which lends itself well to large-scale operations, the temperature of the metal fluoride solids and the condensation of acid on the solids is shown as being controlled by positioning liquid acid sprays throughout the length of the reactor.

It has been found in accordance with the present invention that a significant improvement in raw material conversion is obtained when conducting this process in a continuous counter-current manner if the liquid sulfuric acid is vaporized in the part of the reactor near the solids discharge end thereof wherein the metal fluoride reactant has been already converted to a residue substantially free of fluoride. The sulfuric acid vapor formed mixes with sulfur trioxide vapor and water vapor and the resulting gaseous-mixture is passed into counter-current contact with the remaining bed solids in the reactor, while maintaining these solids within the temperature range of from 100° C. to the boiling point of sulfuric acid at the pressure used. As defined by its temperature, the heat content of the gaseous mixture is controlled within the specified temperature range so that the gaseous mixture containing sufficient sulfuric acid, sulfur trioxide and steam to react the fluoride, will condense on the surface of the solids rapidly enough to cause effective reaction without causing the solid particles to become sticky.

A better understanding of the method of the process of the invention will be gained from the following detailed descriptions taken together with the accompanying patent drawings in which.

Figure 1:
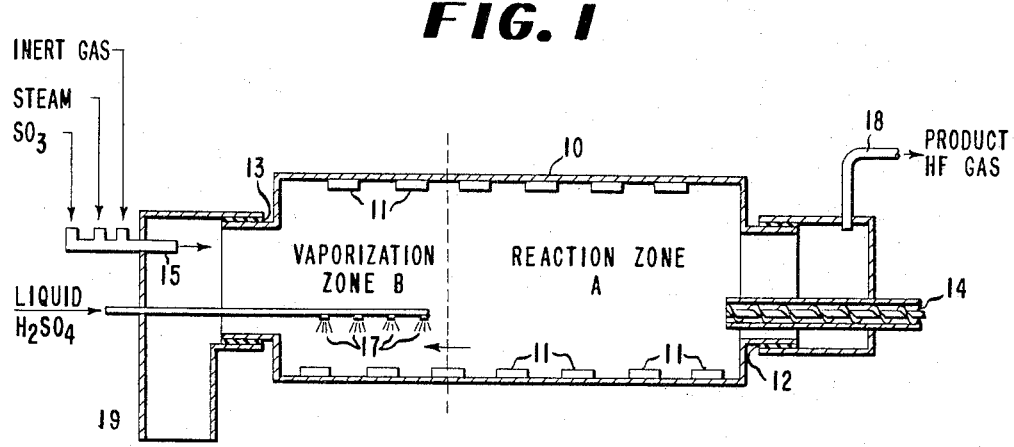
FIGURE 1 illustrates schematically a continuous rotary reactor found useful for the processes in this invention.

Referring now to FIGURE 1 of the drawing, there is provided a rotary reactor consisting of a rotating shell 10 having lifter blades 11 to pickup bed material and shower solids through the vapor space of the reactor. The reactor is equipped with suitable seals 12 and 13 to prevent leakage of air into, or process gases out of, the reactor. The interior of the reactor is shown as divided into two zones, reaction zone A and vaporization zone B. Reaction zone A extends from the reactant solid input end of the reactor to the position within the reactor where the metal fluoride solids have been substantially converted to a solid residue, i.e., a solid which contains no appreciable amount of fluoride reactant. Zone B extends from this position within the reactor to the residue discharge end of the reactor. Metal fluoride reactant, such as calcium fluoride, is fed continuously into the reactor by means of screw conveyor 14. Steam, sulfur trioxide vapor, and optionally an inert gas such as air or HF itself enters the reactor by means of line 15. Liquid sulfuric acid is introduced into the reactor by line 16 and is vaporized in vaporization zone B by spraying through nozzles 17. This liquid stream is vaporized both from the surface of the liquid spray particles and/or from the wetted surface of the solid metal sulfate particles as they are showered through the hot gas stream by the lifter blades 11. The heat for the vaporization is generated by the reaction of sulfur trioxide with water.

In the practice of this process, the amount of sulfuric acid condensible from the gaseous mixture entering the fluoride reaction zone A is approximately stoichiometrically equal to or slightly in excess of the sulfuric acid required to react the metal fluoride present therein. The temperature of this gaseous mixture is such that the condensation of the sulfuric acid liberates only the heat required to carry out the reaction of the metal fluoride with the sulfuric and to supply the equipment heat losses from the process while maintaining the solids temperature within a range of 100° C. to the boiling point of sulfuric acid at the pressure of the operation. This desired heat availability and liquid sulfuric acid availability from the gas stream entering the reaction zone A is achieved by adjusting the feeds of liquid acid, sulfur trioxide and steam to the vaporization zone B. Additional heat is made available by decreasing the proportion of the total sulfuric fed as liquid.

In order to facilitate the condensation process in the reaction zone the gas stream leaving the vaporization zone should be at or just slightly above its dewpoint when containing the required condensible sulfuric acid at the required temperature. Also, vaporization will cease, of course, if the gas stream temperature falls to the dewpoint in the vaporization section. For example, at a total pressure of one atmosphere absolute a dewpoint mixture of only sulfuric acid vapor with the equilibrium amounts of sulfur trioxide vapor and water vapor will yield more heat upon condensation of the sulfuric therefrom than is required to react the condensed sulfuric with calcium fluoride. The further cooling of this gas mixture to lower its heat content would result in condensation and the full amount of sulfuric would not be carried forward to the reaction zone. The use of an inert gas in this gas stream permits operation of the reactor at atmospheric pressure without the gas stream leaving the vaporization zone below its dew point when sufficiently cool that excess heat is not carried into the reaction zone. The use of inert gas can be eliminated by vacuum operation of the reactor wherein the total absolute pressure is equal to the sum of the partial pressures of the sulfuric acid vapor, water vapor, and sulfur trioxide vapor leaving the vaporization zone when the gas mixture is at the desired temperature.

The product off gas containing the HF leaves by means of line 18, the dust therein being largely removed by a conventional dust collector not shown and the HF taken to a standard collection and purification system. The reactant residue leaves by overflowing through stationary nozzle 19.

Figure 2:
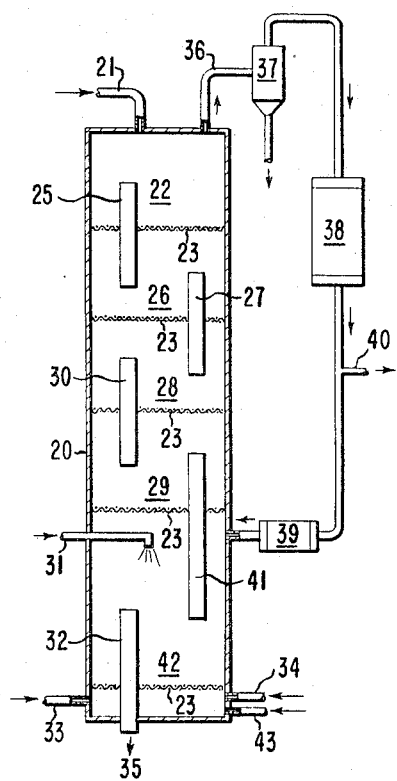
FIGURE 2 illustrates schematically a multi-step fluidized bed reactor according to the present invention.

Referring now to FIGURE 2 of the drawing, near the top of the fluidized bed reactor 20 cold metal fluoride particles are fed through inlet 21. The cold metal fluoride particles are introduced into zone 22 above retaining screen 23 where they are preheated, partially reacted, and maintained in a fluidized condition by the gaseous mixture coming upward through the screen 23 from zone 26. Excess solids from zone 22 overflow downward through the downcomer 25.

The material passing downward into lower reaction zone 26 is therein maintained in a fluidized state and in turn passes through a second downcomer 27 into reaction zone 28. The metal fluoride is progressively reacted to form metal sulfate with the release of vaporous hydrogen fluoride.

The solid components again pass downward through downcomer 30 into reaction zone 29 and through downcomer 41 to vaporization zone 42. Liquid sulfuric acid is introduced through pipe 31 and sprayed into the solids bed and/or into the vapor space above the fluidized bed of vaporization zone 42 to control the heat and material balance of the reaction. Through feed pipes 33 and 34, respectively, sulfur trioxide vapor and steam are also introduced into the vaporization zone. The sulfuric acid is vaporized from the surface of the spray particles and from the surface of the metal sulfate particles in the vaporization zone. The gaseous mixture of sulfur trioxide vapor, steam, and sulfuric acid vapor passing through retaining screen 29 contains sufficient condensible sulfuric acid to react the metal fluoride entering the process and sufficient heat to carry out the endothermic metal fluoride reaction while maintaining the temperature of the reaction zones in the range of 100° C. to the boiling point of sulfuric acid at the pressure of the operation. The use of an inert gas such as air or HF vapor fed through pipe 43 permits operation of the reactor at atmospheric pressure with the gas stream leaving the vaporization zone at or slightly above its dew point when sufficiently cool that excess heat is not carried into the reaction zones. Metal sulfate essentially free of sulfuric acid overflows through the downcomer 32 and is discharged from the equipment. The total number of stages similar to zones 28 and 42 used will depend on the parameters influencing fluid bed designs as will be familiar to one skilled in the art. The number of stages may be from 2 to 50 with 5 to 20 preferred. The number of stages used for the vaporization of liquid acid will also depend on such design parameters including size of stages, degree of acid atomization, et cetera. In practice from 1 to 7 or about 30% of the total number of stages, has been found particularly useful. However, more may be desired under some conditions.

Product HF leaves the reactor through outlet 36 and passes through a suitable dust collector 37. Solid metal fluoride and metal sulfate dust are returned to the reaction zone 22 or removed from the system. Recycle of coarse metal fluoride dust and removal of fine dust largely metal sulfate is advantageous. Enough fines should be retained in the bed for good fluidization. The vapors from dust collector 37 are cooled in a condenser 38. At this stage, high-boiling components such as sulfuric acid and fluosulfonic acid are removed from the system. Reusable liquids in the system are recycled and heated to the proper temperature in heat exchanger 39. The recycle can be returned either as vapors to any suitable stage or as a liquid to the vaporization zones where it is suitably dispersed as by spraying. This recycle can be distributed to several bed zones.

Instead of using a surface condenser, as shown, a wet type gas scrubber or other equivalent apparatus could of course be used to remove undesired components from the product gas stream. Wet scrubbing is particularly advantageous if the dust separator is for any reason less efficient than desired.

It will also be readily apparent that instead of the fluidized bed and rotary reactors shown one can readily use any type of gas solids contacting equipment which gives the desired sequence of gas-solids contacting. For example, screw conveyors, pug mills, et cetera could be adapted. Furthermore, for example, the fluidized solids system could be revised to use several separate reaction vessels with separate gas and solids conveying between such units.

The preferred metal fluoride for purposes of the invention for economic reasons is calcium fluoride although any alkali metal or alkaline earth metal fluoride is suitable. Commercially available "acid-grade" fluorspar is preferred as the calcium fluoride source because it has a low silica content. Such commercial products usually have particle sizes characterized in the trade as "70% through 200 mesh," "77% through 200 mesh," and the like. Still finer fluorspar can be prepared by grinding to a desired size and the fluorspar can be pelleted to make larger particles if desired.

The fluorspar particle size should be selected and the equipment designed taking into account consideratons normally applicable to the type of equipment selected. This requires a balance of the particle size, it mass, rates of gas flow, the volumes of gases used, the mixing efficiency, the hold time, etc. Balance of those factors of importance to the equipment design selected is well understood in the art and does not require detailed description here.

The sulfuric acid used should be at least 90% $H_2SO_4$ relative to its water content and is preferably 98–100% $H_2SO_4$. If more cooling is wanted in the process, there can be used, of course, a more dilute sulfuric acid. The liquid sulfuric may also be oleum with its free sulfur trioxide content substituting for part or all of the sulfur trioxide feed. The sulfuric acid also may contain impurities such as HF, $HSO_3F$, sulfur, metal sulfates and other impurities present in acid streams recovered from the process or as may be present in the acid supply.

Sulfur trioxoide such as is commercially available from the distillation of oleum, is suitable for the process of the invention. Steam introduced into the process will normally be saturated steam as available on a plant, but super-heated steam can be used if desired.

The total amount of sulfuric acid introduced into the process of the invention should be somewhat more than that stoichiometrically required. The acid is ordinarily used in from a 0 to 10% excess, and preferably 1 to 5% excess, based on complete conversion of the metal fluoride. Larger excesses can be used but is wasteful of acid. Depending on operating conditions, a recycle of sulfuric acid will exist internally within the reactor between the reaction and vaporization zones. Part of any excess acid carried by the gas into the reaction zone may return to the vaporization zone as liquid acid in the solid bed. Such acid is then part of the sulfuric available for vaporization. Normally it is desirable that such excess acid in the bed leaving the reaction zone be from 0–10% and preferably 0.3–5% based on total conversion of metal fluoride. Larger excesses can be used but extremely large excesses may cause difficulties because of excessive condensation on the metal fluoride.

The sulfur trioxide will normally be used in such proportion relative to the steam and the strength of the sulfuric acid so that there will be a water to sulfur trioxide balance of approximately 1 mole of water for each mole of sulfur trioxide. The use of an overall sulfur trioxide to water ratio equivalent to 98 to 99% sulfuric acid has been found to be preferable. Stronger ratios can be used but result in greater formation of fluosulfonic acid. Weaker ratios can be used with a corresponding increase in the moisture content of the product gas stream.

The temperatures maintained within the reaction zone of the reactor are quite important. The temperature should be in a range of from 100° C. up to, but below the boiling point of sulfuric acid at the pressure used in the process. Therefore, at atmospheric pressure the temperature within the reaction zone of the reactor should not exceed approximately 335° C. and preferably is held in a range of from about 100 to 300° C. The optimum temperature in any particular point in the reaction zone of the reactor is that temperature which condenses sulfuric acid as rapidly as it will react without giving sufficient free liquid sulfuric to cause caking of the solid particles. This temperature is a function of bed fluoride content and gas composition, as will be readily understood by those skilled in the art and can be readily adjusted upwardly or downwardly by using the appropriate amounts of sulfur trioxide and steam on the one hand and sulfuric acid on the other.

Of course, it will be appreciated that the pressure at which the process is operated will influence the temperatures at which successful operation can be obtained. For example, the use of superatmospheric pressures will permit sulfuric acid to condense on metal fluoride particles at temperatures above the normal boiling point (335° C.) of sulfuric acid. Conversely, vacuum operation will reduce the temperature at which sulfuric acid will condense and thus permit operation at lower temperatures. Therefore, by the proper selection of pressure, temperature, and equipment size the process can be conducted according to the invention at almost any temperature above that at which sulfuric acid and an alkali metal fluoride start reacting, i.e., about 100° C.

For most efficient operation, the temperatures will be near the top of the range toward the end of the reaction of the metal fluoride, i.e., near the interface of the vaporization zone and the reaction zone, to minimize the amount of sulfuric acid which may be carried out at the system; and the temperatures will be near the bottom of the range at the point where the hydrogen fluoride is taken off the reactor to reduce the amount of sulfuric acid vapor carried off with the product. The above temperature gradients will result in the equipment illustrated.

The walls of the reactor should be kept warm to avoid condensation of sulfuric acid on the walls. This can be done by the use of external heating means, such as steam or electrical heating or in other instances can be conveniently accomplished by insulation of the walls.

The invention will be further explained by the following examples which illustrate the best mode contemplated for carrying out the invention.

*Example 1*

Utilizing the apparatus shown in the attached drawing, (FIGURE 1), commercial grade fluorspar, 65% through 325 mesh, is introduced through feed screw conveyor 14 at a rate of 100 pounds per hour. Through line 15 a gaseous mixture of sulfur trioxide vapor, saturated steam, and HF vapor are introduced into the reactor at 14.6 p.s.i.g. and 386° C. In this manner sulfur trioxide is supplied at the rate of 63 pounds/hr., steam at a rate of 14.15 pounds/hr., and HF at a rate of 13.3 pounds/hr. Through spray nozzle 17, sulfuric acid of 99% strength is added at a rate of 51 pounds/hr.

The liquid acid is added through 2 spray nozzles equally spaced along the length of vaporization zne B. The rate of acid addition is controlled to maintain about equal acid flow through each nozzle in use. The temperatures of the bed in the reactor gradually increases from about 170° C. near the fluorspar addition end to about 310° C. at the interface between the reaction zone A and the vaporization zone B and to 338° C. at the residue discharge end.

The sulfuric acid vapor formed in the vaporization zone admixes with the sulfur trioxide, steam, and HF vapor present and the resulting gaseous mixture passes into countercurrent contact with the bed present in reaction zone A of the reactor. Temperatures of the bed in the reaction zone of the reactor exhibit a temperature gradient, wherein the temperature gradually decreases from about 310° C. at the vaporization zone-reaction zone to about 170° C. near the hydrogen fluoride takeoff at the reaction zone end of the reactor.

Calcium sulfate containing less than 1% by weight unreacted calcium fluoride and approximately 1% free sulfuric acid is discharged through nozzle 19. HF product gas containing small amounts of silicon tetrafluoride, carbon dioxide, sulfur dioxide, sulfuric acid vapor, and dust leaves the reactor via line 18 and passes through a recovery train from which commercial grade HF is isolated. The recovery train, of course, forms no part of the present invention and any suitable isolation system can be employed. Such systems are described in Patent No. 3,102,787.

*Example 2*

Using apparatus of the type illustrated in FIGURE 2 of the drawing and having a total of 10 stages, 217 pounds/hr. of commercial acid grade fluorspar 70% through 200 mesh is introduced at the top of the reactor through feed pipe 21. Sulfuric acid (99% concentration) in the amount of 111 pounds/hr. is dispersed in three vaporization stages similar to 42, by spraying above the top surface of the fluidized beds of calcium sulfate through feed pipes 31.

Sulfur trioxide vapor in an amount of 139 pounds/hr., steam in an amount of 31 pounds/hr., and HF vapor in an amount of 45 pounds/hr., are introduced to the bottom of the reactor through nozzles 33, 34, and 43 respectively. Heat generated by the reaction of sulfur trioxide and steam produces a superheated gaseous mixture of sulfuric acid vapor, sulfur trioxide vapor, steam, and HF vapor at a temperature of about 385° C. which flows upward into the vaporization stages.

This superheated gas stream vaporizes the sulfuric acid sprayed into the vaporization stages producing a gaseous mixture of sulfur trioxide vapor, steam, sulfuric acid vapor, and HF vapor which is at or slightly above its dew point of about 310° C. As this gas stream rises through the reaction stages, similar to 26, 28, 29, sulfuric acid is condensed on the solids and reacts with the fluorspar as it moves downward from stage to stage. Calcium sulfate passes into the upper vaporization stage, thence to the middle and thence to the bottom such stage before being discharged through outlet pipe 35.

The hydrogen fluoride evolved is passed through a dust collector 37 and the dust, which is essentially pure calcium sulfate, is discharged from the collector to residue disposal. The gas is cooled to 35° C. in condenser 38. The gas from the condenser is passed through line 40 to a conventional mist filter and then to a hydrogen fluoride condenser. The condensate from the condenser 38 and the liquid removed in the mist filter are heated to about 250° C. in the heater 39 and sprayed into the vapor space above the bed in the bottom vaporization stage.

Although in the above examples calcium fluoride is used as the crude material from which HF is produced other alkali metal fluorides or alkaline earth metal fluorides such as sodium fluoride, or barium fluoride can equally well be used provided the heat and material balances are properly adjusted. The method of substitution of fluorides other than calcium fluoride is set forth in the examples of U.S. Patent 3,102,787, and will be readily understood by those skilled in the art.

Since many different embodiments of the invention may be made without departing from the spirit and scope thereof, it is to be understood that the invention is not limited by the specific illustrations hereinabove set forth except to the extent defined in the following claim.

I claim:

In a continuous, countercurrent process for producing hydrogen fluoride by reacting in a closed reactor calcium fluoride with a gaseous mixture containing sulfuric acid vapor, sulfur trioxide vapor, water vapor, and hydrogen fluoride vapor wherein the amount of equivalent condensable sulfuric acid is at least equal to that stoichiometrically required to react with said calcium fluoride while maintaining a temperature within the range of 100° C. to the boiling point of sulfuric acid at the pressure used by feeding liquid sulfuric acid to said reactor, the improvement comprising introducing liquid sulfuric acid and a feed gas stream containing sulfur trioxide vapor, water vapor, and hydrogen fluoride vapor into a first portion of said closed reactor containing a moving bed of hot residue solids essentially free of unreacted calcium fluoride, contacting said residue solids in said first portion of said recator with said liquid sulfuric acid and converting said liquid sulfuric acid to sulfuric acid vapor and then passing the resulting gaseous mixture of sulfuric acid vapor, sulfur trioxide vapor, water vapor, and hydrogen fluoride vapor from said first portion of said reactor into a second portion of said closed reactor containing a moving bed of calcium fluoride.

References Cited by the Examiner
UNITED STATES PATENTS
3,102,787   9/1963   McMillan et al. _____ 23—153

OSCAR R. VERTIZ, *Primary Examiner*.

EDWARD STERN, *Assistant Examiner*.